US012770467B2

(12) United States Patent

Danielson et al.

(10) Patent No.: US 12,770,467 B2
(45) Date of Patent: Oct. 20, 2026

(54) PERSONAL FUNDING OF AWARDS

(71) Applicant: IGT, Las Vegas, NV (US)

(72) Inventors: Patrick Danielson, Las Vegas, NV (US); Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 168 days.

(21) Appl. No.: 18/528,102

(22) Filed: Dec. 4, 2023

(65) Prior Publication Data

US 2025/0182575 A1 Jun. 5, 2025

(51) Int. Cl.
*G07F 17/32* (2006.01)
*G06Q 30/08* (2012.01)

(52) U.S. Cl.
CPC ......... *G07F 17/3258* (2013.01); *G06Q 30/08* (2013.01); *G07F 17/3267* (2013.01); *G07F 17/3272* (2013.01)

(58) Field of Classification Search
CPC ............. G07F 17/3258; G07F 17/3267; G07F 17/3272; G06Q 30/08
See application file for complete search history.

(56) References Cited

U.S. PATENT DOCUMENTS

| | | | | |
|---|---|---|---|---|
| 6,032,955 | A | 3/2000 | Luciano et al. | |
| 6,776,715 | B2 | 8/2004 | Price | |
| 8,246,468 | B2 | 8/2012 | Anderson et al. | |
| 8,267,774 | B2 | 9/2012 | Englman et al. | |
| 8,506,391 | B2 | 8/2013 | Jaffe et al. | |
| 8,517,828 | B2 | 8/2013 | Dewaal et al. | |
| 8,616,962 | B2 | 12/2013 | Anderson et al. | |
| 8,632,394 | B2 | 1/2014 | Muir | |
| 9,697,680 | B2 | 7/2017 | Paradise et al. | |
| 10,467,864 | B2 | 11/2019 | Filipour et al. | |
| 10,726,678 | B1 * | 7/2020 | Rehill | G07F 17/326 |
| 2007/0057464 | A1 * | 3/2007 | Cockrell, Jr. | A63F 1/00 273/303 |
| 2007/0077981 | A1 | 4/2007 | Hungate et al. | |
| 2008/0242421 | A1 * | 10/2008 | Geisner | A63F 13/75 463/42 |
| 2010/0203958 | A1 * | 8/2010 | Jackson | G07F 17/3258 463/17 |
| 2010/0248814 | A1 * | 9/2010 | Carson, Jr. | G07F 17/32 463/25 |
| 2011/0009197 | A1 * | 1/2011 | Peltz | G07F 17/3246 463/46 |
| 2019/0287342 | A1 * | 9/2019 | Rader | G07F 17/3255 |
| 2020/0242885 | A1 * | 7/2020 | Culp | G07F 17/3241 |
| 2020/0388110 | A1 | 12/2020 | Saunders | |

* cited by examiner

*Primary Examiner* — Jeffrey K Wong
(74) *Attorney, Agent, or Firm* — Neal, Gerber & Eisenberg LLP

(57) ABSTRACT

Systems and methods that enable an item and/or an amount of funds associated with a user to be made available in association with an award opportunity provided to a player of a gaming device.

20 Claims, 7 Drawing Sheets

PERSONAL FUNDING OF AWARDS

CROSS-REFERENCE TO RELATED APPLICATIONS

This application is related to the following commonly owned co-pending patent applications: U.S. application Ser. No. 18/528,145, entitled "PARTIAL PERSONAL FUNDING OF AWARDS," and U.S. application Ser. No. 18/528,265, entitled "GAMING AWARDS PROCURED VIA ONLINE RETAIL PLATFORM".

BACKGROUND

In various embodiments, the systems and methods of the present disclosure enable an item and/or an amount of funds associated with a user to be made available in association with an award opportunity provided to a player of a gaming device.

Gaming machines may provide players awards in primary games. Gaming machines generally require the player to place or make a wager to activate the primary or base game. The award may be based on the player obtaining a winning symbol or symbol combination and on the amount of the wager.

BRIEF SUMMARY

In certain embodiments, the present disclosure relates to a system including a processor, and a memory device that stores a plurality of instructions. When executed by the processor responsive to an occurrence of a user contribution event, the instructions cause the processor to enable a user to contribute an item, and associate the contributed item with an award. When executed by the processor responsive to an occurrence of a contribution escrow event, the instructions cause the processor to escrow an amount in association with the contributed item. When executed by the processor responsive to an occurrence of an award triggering event, the instructions of these embodiments cause the processor to cause at least the contributed item to be provided to a player associated with the occurrence of the award triggering event, and cause at least a portion of the escrowed amount to be provided to the user.

In certain embodiments, the present disclosure relates to a system including a processor, and a memory device that stores a plurality of instructions. When executed by the processor responsive to an occurrence of a user contribution event, the instructions cause the processor to enable a user to contribute an amount of funds, and associate the contributed amount of funds with a progressive award. When executed by the processor responsive to an occurrence of a progressive award increment event, the instructions cause the processor to increase a value of the progressive award, and escrow an amount in association with the contributed amount of funds. When executed by the processor responsive to an occurrence of an award triggering event, the instructions of these embodiments cause the processor to cause the progressive award to be provided to a player associated with the occurrence of the award triggering event, and cause at least a portion of the escrowed amount to be provided to the user.

In certain embodiments, the present disclosure relates to a system including a processor, and a memory device that stores a plurality of instructions. When executed by the processor responsive to a random occurrence of an award triggering event at a first point in time when a first amount of funds are escrowed in association with an element of value contributed by a user, the instructions cause the processor to cause a first award inclusive of the element of value to be provided to a first player associated with the occurrence of the award triggering event, and cause at least a portion of the first amount of funds to be provided to the user. When executed by the processor responsive to the random occurrence of the award triggering event at a second, subsequent point in time when a greater, second amount of funds are escrowed in association with the element of value contributed by the user, the instructions cause the processor to cause a second award inclusive of the element of value to be provided to a second player associated with the occurrence of the award triggering event, and cause at least a portion of the second amount of funds to be provided to the user.

Additional features are described herein, and will be apparent from the following Detailed Description and the figures.

DETAILED DESCRIPTION

Figure 1:
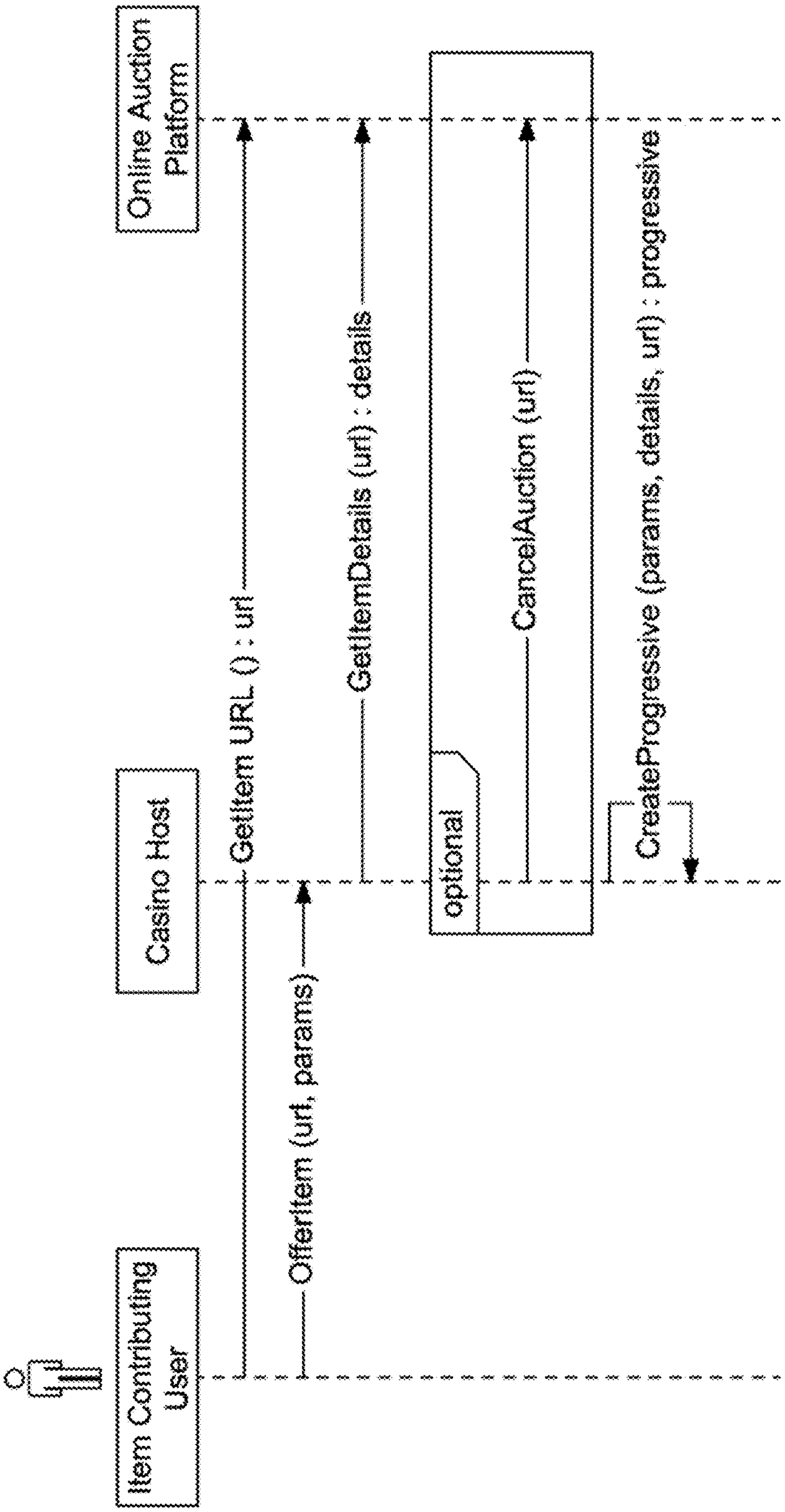
FIG. 1 is a flow chart of an example process for operating a system that enables an item listed for sale on an online auction platform to be made available in association with an award from a play of a game.

In various embodiments, the systems and methods of the present disclosure enable an item and/or an amount of funds associated with a user to be made available in association with an award opportunity provided to a player of a gaming device.

In certain embodiments, the system enables a user to contribute an item, such as a prize won from a past play of a game or a product otherwise procured independent of any play of any game, in exchange for part or all of the portions of wagers placed on one or more plays of one or more games to potentially win the contributed item. In these embodiments, the user contributed item funds at least part of the award and at least part of the wager-based contributions one or more players at one or more gaming devices make endeavoring to win the award become available to the user when the user contributed item is won in association with a play of a game. That is, the system of this embodiment of the present disclosure enables a user to put up an item of value to fund at least part of the value of an award and upon the award inclusive of the item being won, the system provides a winning player the contributed item and also provides the contributing user part or all of the value attributable to wagers placed in efforts to win that item.

In certain embodiments, the system enables a user to contribute an amount of funds to seed a progressive award in exchange for at least part of the growth of that progressive award. In these embodiments, the user contributed amount of funds are used as part or all of an initial value of a progressive award and at least part of the wager-based contributions to the progressive award become available to the user when the progressive award is won in association with a play of a game. Put differently, the system of this embodiment of the present disclosure enables a user to put up an amount of money to seed at least part of the value of a progressive award and upon the progressive award being won, the system provides a winning player the value of the progressive award and also provides the contributing user part of the growth amount of the progressive award attributable to wagers placed in efforts to win the progressive award.

More specifically, in certain embodiments, upon a user contribution event, the system enables a user to contribute an element of value to fund part or all of one or more awards available from one or more plays of one or more games at one or more gaming devices, such as one or more electronic gaming machines and/or one or more gaming tables. In certain such embodiments, the contributed element of value comprises an item to be associated with an award available from one or more plays of one or more games at one or more gaming devices. In different embodiments, the item comprises an item won from one or more prior gaming sessions (e.g., a prize from a prior play of a game), an item obtained from a gaming establishment (e.g., a loyalty prize gifted to the user from a gaming establishment), and/or an item obtained independent from a gaming establishment (e.g., an item procured by a user from a retail location independent of any gaming establishment). In certain embodiments, the element of value additionally or alternatively comprises an amount of funds to be associated with an award available from one or more plays of one or more games at one or more gaming devices.

In certain embodiments, following a user contribution event in which a user contributes an item and/or an amount of funds, the system enables one or more players at one or more gaming devices the opportunity to play one or more games for the contributed item and/or an award at least partially funded by the contributed amount of funds. In certain embodiments, for one or more plays of one or more games played for a user contributed item and/or a user funded award, such as a user funded progressive award, the system tracks the wagers placed (or a portion of the wagers placed) on such plays of such games. These tracked wagers at least partially determine the amount available to the user that contributed the item and/or the amount of funds.

In certain embodiments, upon an occurrence of an award triggering event, the system causes the award associated with the user contributed item and/or user contributed funds to be won by a player. In different embodiments in which a contributed item is won, the system causes the item to be made available to the player that won the award by delivering the item to the player, coordinating the user's delivery of the item to the player and/or procuring the item from an online retail platform in which the item is otherwise available, such as an online auction platform.

In addition to causing at least the contributed item and/or amount of funds contributed by a user to be made available to a player upon an occurrence of an award triggering event, the system compensates the user for the contribution with part or all of the amount of funds collected by the system by players in pursuit of winning the contributed item and/or amount of funds. That is, in exchange for a user contributing one or more personal items and/or an amount of funds to be associated with an available award, the system allocates at least part of the wagers placed to win that award back to the user. For example, if a user contributed an amount of funds to seed a start-up value of a progressive award, then a portion of wagers placed on plays of games for chances to win that progressive award are allocated to the user that contributed such funds. In this example, the larger the growth of the progressive award based on wagers placed without an occurrence of an award triggering event, the larger the amount of such wagers allocated to the user that contributed the funds of the progressive award start-up value. In another example, if a user contributed a personal item as an award, then a portion of wagers placed on plays of games for chances to win that personal item are allocated to the user that contributed the item. In this example, the more wagers unsuccessfully placed by players to win the contributed item, the larger the amount allocated to the user that contributed the contributed item.

Accordingly, unlike prior systems that provided users no ability to back any awards, the system of the present disclosure enables users to bankroll one or more awards in which the upside of at least a portion of unsuccessful wagers placed on that award are allocated to the contributing user. Additionally, unlike prior systems that provided unwanted/unneeded items to individuals as awards, the system of the present disclosure offers an avenue for such individuals to dispense of such items in a way that may be potentially even more lucrative than initially winning the item. Moreover, by operating with one or more online retail platforms in which the item is otherwise available, such as an online auction platform, the system offers an additional avenue for individuals to exchange such items in a way that may be potentially even more lucrative than selling the item via the online retail platform. Such a configuration introduces an improvement by ensuring that users of the system are playing for the awards they want and/or can risk unwanted awards and/or products in exchange for possible higher valued awards.

While certain embodiments described below are directed to contributing items and/or funds made available as awards from plays of games in association with an electronic gaming machine ("EGM") such as a slot machine, a video poker machine, a video lottery terminal, a terminal associated with an electronic table game, a terminal associated with a live table game, a video keno machine, a video bingo machine and/or a sports betting terminal that offers sports betting opportunities, it should be appreciated that such embodiments may additionally or alternatively be employed in association with contributing items and/or funds made available as awards from plays of games in association with any suitable component of a patron management system, such as a slot machine interface board ("SMIB"), which is in communication with an EGM, any suitable personal gaming device (e.g., a mobile device executing a mobile device application that accesses data associated with the game over a network) and/or any suitable combination of a server operating with such a personal gaming device, with such an EGM, and/or with such a SMIB associated with an EGM.

In certain embodiment, the system periodically determines if an user contribution event occurred. In these embodiments, the system determines whether or not to enable a user to contribute an item and/or an amount of funds in association with an award available to be won by one or more players of one or more games otherwise offered by the system.

In certain embodiments, a user contribution event occurs based on one or more displayed events occurring in association with one or more plays of one or more games. In certain embodiments, a user contribution event occurs based on an individual achieving a certain outcome, such as obtaining one of more outcomes associated with a specific win category (e.g., winning a royal flush). In certain other embodiments, a user contribution event occurs based on an individual winning a certain amount from a play of a single game, a certain prize from a play of a single game or winning a certain amount over a period of time. In certain other embodiments, a user contribution event occurs based on an individual maintaining an active gaming session for a certain amount of time and/or over a certain quantity of games played.

In certain embodiments, a user contribution event occurs independent of any displayed events associated with any plays of any games. In one embodiment, a user contribution event randomly occurs. In another embodiment, a user contribution event occurs at a randomly selected time.

In certain embodiments, one or more actions (or inactions) undertaken by a user at least partially determines whether a user contribution event occurs. In one such embodiment, a user contribution event occurs based on a user making one or more inputs requesting a contribution to seed an award. For example, if an individual at an EGM wins a prize that is not needed or otherwise wanted by the individual, the system enables the individual to request to contribute that prize to seed part or all of an award. In this example, upon receiving the request, the system determines whether to accept the request (and cause a user contribution event to occur) or reject the request without any occurrence of a user contribution event.

In certain embodiments, the system enables any individual to request an occurrence of a user contribution event. In another embodiment, a user contribution event occurs based on an individual purchasing an occurrence of the event using one or more of an amount of funds, an amount of virtual currency and/or an amount of player tracking points. In one such embodiment, a user contribution event occurs based on an individual purchasing such an event for a static fee (in the form of an amount of funds, an amount of virtual currency and/or an amount of player tracking points). In another such embodiment, a user contribution event occurs based on an individual purchasing such an event for a dynamic fee (in the form of an amount of funds, an amount of virtual currency and/or an amount of player tracking points).

In certain embodiments, different contributions have different purchase prices of a user contribution event occurring in association with that contribution. In certain embodiments, each contribution has the same purchase price of a user contribution event occurring in association with that contribution. In certain embodiments, a probability of winning an award associated with a contribution at least partially determines a purchase price of a user contribution event occurring in association with that award. In certain embodiments, a value of a contribution at least partially determines a purchase price of a user contribution event occurring in association with that contribution.

In certain embodiments, different individuals have different requirements to cause a user contribution event to occur. In certain such embodiments, an individual's wagering history at least partially determines whether or not that individual is eligible to cause a user contribution event to occur. In certain embodiments, which EGM the individual is currently conducting a gaming session at at least partially determines whether or not that individual is eligible to cause a user contribution event to occur. In these embodiments, an individual can initiate a contribution in association with a certain EGM operating in a certain configuration, such as an individual can initiate a contribution for a certain themed EGM of a certain denomination and the individual cannot initiate any contributions at other themed EGMs or other denominations of that themed EGM. In certain other embodiments, an individual's non-wagering history, such as an individual's historical non-wagering purchases and/or an individual's historical location data (as determined via a mobile device of the individual and/or a gaming establishment patron management system, such as a player tracking system) at least partially determines whether or not that individual is eligible to cause a user contribution event to occur.

In certain embodiments, an individual's status (as determined by a gaming establishment patron management system, such as a player tracking system) at least partially determines one or more requirements to cause a user contribution event to occur. In these embodiments, different individuals of different statuses are associated with different requirements to cause a user contribution event to occur. For example, all individuals associated with a player tracking status (or alternatively all individuals regardless of being assigned a player tracking status) are eligible to request an occurrence of a user contribution event, but the respective costs to such individuals to cause the user contribution event to occur differs based on each individual's respective player tracking status. In another example, certain individuals of certain player tracking statuses are eligible to request an occurrence of a user contribution event while certain other individuals of certain other player tracking statuses (or not player tracking status) are ineligible to request an occurrence of a user contribution event.

In certain embodiments, the system enables qualifying individuals to request an occurrence of a user contribution event and prevents non-qualifying individuals from making such requestions. In certain such embodiments, the system enables individuals at EGMs associated with a progressive award to request an occurrence of a user contribution event in association with that progressive award. In certain such embodiments, the system enables individuals of a certain status to request an occurrence of a user contribution event (e.g., an individual must be a member of a gaming establishment loyalty program to make a request or an individual must be of at least a certain status of a gaming establishment loyalty program to make a request). In certain embodiments, the system enables individuals whom have maintained an active gaming session for a certain amount of time and/or over a certain quantity of games played to make a request for a user contribution event. In certain embodiments, the system enables individuals whom have wagered a certain amount over a period of time to make the request for a user contribution event. In certain embodiments, a user contribution event occurs based on an individual (or group of individuals) wagering a certain amount over a period of time. In other embodiments, a user contribution event occurs based on an individual (or group of individuals) participating in one or more offerings available to the individual.

In another embodiment, a user contribution event occurs or is otherwise enabled based on a current state of a gaming establishment. For example, upon the system determining that gaming activity at a gaming establishment is currently lower than expected, the system enables the occurrence of one or more user contribution events for a set amount of time or until the system determines that the level of gaming activity at the gaming establishment is more in line with expectations. In another embodiment, a user contribution event occurs or is otherwise enabled based on a current state of a progressive award. For example, upon the system determining that the current value of a progressive award is not within a designated range of a threshold value, the system causes the user contribution event to occur for that progressive award.

In another embodiment, a user contribution event occurs as part of a gaming establishment promotion. In certain such embodiments, one or more actions (or inactions) undertaken by the system (or an operator of the system) determines whether a user contribution event occurs. In one such embodiment, a user contribution event occurs based on an operator of the system making one or more inputs requesting an occurrence of a contribution to seed an award. For example, if an operator wants to launch a progressive award in association with one or more EGMs but does not want to fund the startup value of the progressive award, the operator requests a user contribution event to occur. In certain embodiments, the system enables a user contribution event to occur in association with each of the maintained awards. In certain embodiments, the system enables a user contribution event to occur in association with certain of, but not each of, the maintained awards. In certain embodiments, the system requires a user award contribution enablement event to occur. In one such embodiment, the system enables individuals currently playing for an award to vote to enable a contribution to seed an award. In this embodiment, if all (or at least a threshold percentage) of the individuals decide to enable the contribution to seed an award, the system makes such a feature available. In another such embodiment, the system enables individuals currently playing for an award to vote to disable the feature. In this embodiment, if all (or at least a threshold percentage) of the individuals decide to disable the feature, the system makes such a feature unavailable.

If the system determines that no user contribution event occurs, the system continues to monitor for an occurrence of a user contribution event. On the other hand, if the system determines that a user contribution event, the system enables a user to contribute an item and/or an amount of funds in exchange for a portion of the wagers placed on plays of games to win that item and/or that amount of funds.

In certain embodiments, the system enables a user to contribute any item in exchange for a portion of the wagers placed on plays of games to win that item. In certain embodiments, the system enables a user to contribute certain items, but not other items. In these embodiments, the system determines which items are eligible to be exchanged for a portion of the wagers placed on plays of games to win that item based on one or more factors such as, but not limited to, a type of item, a value of the item (e.g., items having a value of at least a designated amount are eligible to be contributed), a size of the item, and/or a location of the item.

In certain embodiments in which the user contribution includes an item and the item was previously won by a user in association with the system, the system enables the user to elect to contribute the item without taking possession of the item. For example, if a player that won a guitar from an EGM is provided a code to redeem the guitar and the guitar is held by an online service tasked with gaming establishment prize redemptions, the system enables the player to provide the guitar as part of another award and notifies the online service to hold the guitar for that other award. In certain embodiments in which the user contribution includes an item in possession of the user, the system enables the user to deliver the item to a gaming establishment such that upon the item being won, the gaming establishment delivers the item to the winning player. In these embodiments in which the item is held by the gaming establishment, upon receipt of the item, the gaming establishment inspects the item and estimates a value of the item and/or utilizes a reputable source to inspect the item and estimate a value of the item. In certain embodiments, the gaming establishment charges a fee to operate as a clearinghouse of items contributed by users and/or to facilitate this feature for users.

In certain embodiments in which the user contribution includes an item in possession of the user, the system enables the user to retain the item such that upon the item being won, the user is responsible for delivering the item to the winning player. In these embodiments in which the item is held by the user, the system enables the user to provide the system certain information regarding the item, such as an item description, item photographs or videos, any relevant terms and conditions associated with the item and an estimate value of the item. In certain such embodiments, the system enables the user to also input certain safeguards or parameters regarding the contributed item, such as a starting amount of a progressive award to be associated with the item and/or an increment rate of wagers placed to win a progressive award to be associated with the item.

In certain embodiments, the system operates with one or more online retail platforms in association with the item being contributed by the user. In these embodiments, the online retail platform, such as an online auction platform, holds the item such that upon the item being won, the system operates with the online retail platform deliver the item to the winning player. In certain such embodiments, the system operates with the online retail platform to retrieve information regarding the item being contributed by the user. In one embodiment, the system enables the user to link their item posted on an online retail platform to the system. Such a linkage enables the system to learn the name, value and photos of the items from the online retail platform listing. In these embodiments, the linked item becomes eligible to be exchanged for a portion of the wagers placed on plays of games to win that item. For example, as seen in FIG. 1 (which illustrates certain interactions between the user contributing the item, a component of a gaming establishment operating as the system of the present disclosure and an online auction platform), following a user contribution event and a user making one or more inputs to contribute an item otherwise available in association with the online auction platform, the component of the gaming establishment (i.e., the Casino Host) operates with the online auction platform to retrieve various information regarding the item. In this example, the user obtains the uniform resource locator ("URL") of the item listed on the online auction platform and provides that to the component of the gaming establishment along with zero, one or more parameters of the contribution, such as a starting amount of an award to be associated with the contributed item and a contribution rate of an award to be associated with the contributed item. The component of the gaming establishment then utilizes the URL to look up the item on the online auction platform, obtain details (e.g., name, description, pictures) of the item on the online auction platform and employs such obtained details to create an award associated with the item.

In certain embodiments, the value of the contributed item represents a startup value of a progressive award. In these embodiments, as wagers are placed on plays of games to win the progressive award taking the form of at least the contributed item, a portion of such wagers are escrowed for the user (and, in certain instances, a portion of such wagers are allocated to grow a portion of the progressive award distinct from the item). In certain embodiments, the value of the contributed item represents a portion of a startup value of the progressive award. In these embodiments, as wagers are placed on plays of games to win the progressive award taking the form of at least the contributed item, a portion of such wagers are escrowed for the user (and, in certain instances, a portion of such wagers are allocated to grow a portion of the progressive award distinct from the item). Additionally, in these embodiments, the portion of the startup value of the progressive award attributed to the value of the contributed item corresponds with the escrowed portion of the wagers placed on plays of games to win the progressive award. For example, if the value of a contributed item from a user represents 60% of the startup value of a progressive award, then the user is entitled to 60% of the escrowed portions of the wagers placed to win that progressive award.

In certain embodiments, the contributed item represents a static award played for such that as wagers are placed on plays of games to win the award taking the form of at least the contributed item, a portion of such wagers are escrowed for the user. In certain embodiments, the value of the contributed items represents a portion of the static award played for such that as wagers are placed on plays of games to win the award taking the form of at least the contributed item, a portion of such wagers are escrowed for the user and the portion of the award attributed to the value of the contributed item corresponds with the escrowed portion of the wagers placed on plays of games to win the award. For example, if the value of a contributed item from a user represents 50% of the value of an award, then the user is entitled to 50% of the escrowed portions of the wagers placed to win that award.

In certain embodiment, following the linking of an item from the online retail platform to the system, the system operates with the online retail platform to terminate the listing of the item on the online retail platform. For example, as seen in FIG. 1, if the item is listed on an online auction platform, the contribution of the item by the user terminates the ongoing auction associated with that item. In certain other embodiments, following the linking of an item from the online retail platform to the system, the listing of the item on the online retail platform remains active. In these embodiments, when the online retail platform listing expires, such as when an auction expires and the item is awarded to the highest bidder, the item is disassociated from being available in association with the system. However, if the item is won in association with the system prior to the expiration of the online retail platform listing expiring, the system operates with the online retail platform to terminate the listing of the item on the online retail platform.

In certain embodiments, the system enables a user to additionally or alternatively contribute any amount of funds in any form in exchange for a portion of the wagers placed on plays of games to win such funds. In certain embodiments, the system enables a user to contribute certain funds, but not other funds. In these embodiments, the system determines which funds are eligible to be exchanged for a portion of the wagers placed on plays of games to win such funds based on one or more factors such as, but not limited to, an amount of funds (e.g., funds over a certain amount are eligible to be contributed), a form of such funds (e.g., are the funds in monetary currency, cryptocurrency or gaming establishment currency, such as player tracking points), and/or a location of the funds.

In certain embodiments in which the user contribution includes an amount of funds and the amount of funds were previously won by a user in association with the system, the system enables the user to elect to contribute the amount of funds without taking possession of the amount of funds. In one such embodiment, if the won amount of funds triggers one or more regulatory reporting requirements, the election to contribute such funds potentially satisfies such requirements. In certain embodiments in which the user contribution includes an amount of funds in possession of the user, the system enables the user to deliver the amount of funds to a gaming establishment such that upon the amount of funds being won, the gaming establishment delivers the amount of funds to the winning player. In these embodiments in which the amount of funds are held by the gaming establishment, upon receipt of the amount of funds, the gaming establishment escrows such funds until they are won. In certain embodiments in which the user contribution includes an amount of funds in possession of the user, the system enables the user to retain the amount of funds such that upon the item being won, the user is responsible for delivering the amount of funds to the winning player. In these embodiments in which the amount of funds are held by the user, the system enables the user to provide the system certain information regarding the amount of funds, such as a source of the amount of funds (e.g., a gaming establishment cashless wagering account, a financial institution checking account, a financial institution savings account, a credit card account, prepaid account and/or a cryptocurrency wallet) and/or proof of possession of the amount of funds.

In certain embodiments, following the user contributing an amount of funds and zero, one or more parameters of the contribution, such as a starting amount of a progressive award to be associated with the contributed amount of funds and a contribution rate of a progressive award to be associated with the contributed amount of funds, the system associates a progressive award with the contributed amount of funds. In certain embodiments, the contributed amount of funds represents a startup value of the progressive award. In these embodiments, as wagers are placed on plays of games to win the progressive award taking the form of at least the contributed amount of funds, a portion of such wagers are escrowed for the user and a portion of such wagers are allocated to grow the progressive award. In certain embodiments, the contributed amount of funds represents a portion of a startup value of the progressive award. In these embodiments, as wagers are placed on plays of games to win the progressive award taking the form of at least the contributed item, a portion of such wagers are escrowed for the user and a portion of such wagers are allocated to grow the progressive award with the portion of the startup value of the progressive award attributed to the contributed amount of funds corresponding with a portion of the wagers placed on plays of games to win the progressive award attributed to the user. For example, if a contributed amount of funds from a user represents 80% of the startup value of a progressive award, then the user is entitled to 80% of the escrowed portions of the wagers placed to win that progressive award.

In certain embodiments, the contributed amount of funds represents a static award played for such that as wagers are placed on plays of games to win the award, a portion of such wagers are escrowed for the user. In certain embodiments, the value of the contributed amount of funds represents a portion of the static award played for such that as wagers are placed on plays of games to win the static award funded with the amount of user contributed funds, a relative portion of such wagers are escrowed for the user based on the portion of the award funded with the amount of user contributed funds. For example, if a user contributed an amount of funds that represents 90% of the value of an award, then the user is entitled to 90% of the escrowed portions of the wagers placed to win that award.

In certain embodiments, the system enables a user to contribute one or more items and/or amount of funds that collectively have a value equal to (or within a designated range of) a starting value of a progressive award. For example, the system is associated with a progressive award having a startup value of $5000 and the system enables a user to contribute one or more items having a collective value of $5000 in exchange for a portion of growth attributable to that progressive award. In another example employing a progressive award having a startup value of $5000, the system enables a user to contribute, in exchange for a portion of growth attributable to that progressive award, one or more items supplemented with an amount of funds that collectively have a value of $5000.

In certain embodiments, following the association one or more contributions from a user with an award, such as a progressive award, the system maintains that award associated with the contribution. In certain embodiments, the award is a stand-alone award, such as a stand-alone progressive award associated with a single EGM. In certain embodiments, the award is part of a plurality of awards maintained in a multi-level award configuration associated with a single EGM, such as a multi-level progressive award ("MLP") configuration. In certain embodiments, the award is a stand-alone award associated with a plurality of EGMs. In certain embodiments, the award is part of a plurality of awards associated with a plurality of EGMs. In different embodiments wherein the award is associated with a plurality of EGMs, the EGMs may be in (or otherwise associated with) a single gaming establishment (e.g., the award is a local area progressive ("LAP")) or the EGMs may be in (or otherwise associated with) two or more different gaming establishments (e.g., the award is a wide area progressive ("WAP")).

In certain embodiments, as part of maintaining the award, the system determines if a contribution escrow event has occurred in association with the maintained award. In one such embodiment, the contribution escrow event occurs based on (or as a result of) a wager being placed on a play of a game at an EGM associated with that award. In another such embodiment, the contribution escrow event additionally or alternatively occurs based on (or as a result of) a side wager being placed at an EGM associated with that award. In another such embodiment, the contribution escrow event additionally or alternatively occurs based on (or as a result of) one or more displayed events occurring in association with one or more plays of one or more games. For example, the display of one or more symbols during a play of a game results in an occurrence of a contribution escrow event. In another such embodiment, the contribution escrow event occurs independent of any displayed events associated with any plays of any games.

If the system determines no contribution escrow event occurred, the system continues maintaining the award associated with a contribution by a user. In certain embodiments, the system continues maintaining the award associated with a contribution by a user until that award is won. In certain other embodiments, the system continues maintaining the award associated with a contribution by a user until a determination occurs to change or otherwise remove the award from being played for. In certain instances, the lack of any contribution escrow events over a designated period of time are indicative of a lack of interest in players wanting to win the maintained award. In certain such embodiments, if the system determines a lack of interest in winning the maintained award over a designated period of time, the system replaces that maintained award with another award. That is, if not enough players are playing to win a contributed item, the system changes or removes the item. For example, if the system determines a lack of interest on plays of games to win a contributed signed picture of a celebrity, the system replaces the item with another item (from the same user or a different user).

On the other hand, if the system determines that a contribution escrow event occurred, the system increases an escrow associated with the maintained award. In certain embodiments, such an escrow functions to compensate the user for contributing an item and/or an amount of funds to seed one or more awards. In certain embodiments wherein the contribution escrow event occurs based on a placed wager, the increase of the escrow is funded by a portion of the wager placed (e.g., an escrow contribution rate of 1% of the amount of the wager placed is allocated to growing the escrow utilized to compensate the user for contributing an item and/or an amount of funds to seed one or more awards). In certain other embodiments wherein the contribution escrow event occurs based on a placed side wager, the increase of the escrow is funded by part or all of the side wager placed (e.g., an escrow contribution rate of 50% of the amount of the side wager placed is allocated to growing the escrow utilized to compensate the user for contributing an item and/or an amount of funds to seed one or more awards).

In certain embodiments in which the award at least partially seeded with an item from a user and/or an amount of funds from a user is a progressive award, the maintained progressive award is associated with a reset value utilized following that award being provided to a winning player. In certain embodiments, when contributing the item and/or the amount of funds, the user makes one or more inputs indicating the reset value as a parameter of the progressive award associated with the contribute item and/or contributed amount of funds. In certain embodiments wherein the system maintains a plurality of progressive awards, each of the progressive awards maintained by the system have the same progressive award reset value. In certain embodiments wherein the system maintains a plurality of progressive awards, two or more of the progressive awards maintained by the system have different progressive award reset values.

In certain embodiments in which the award at least partially seeded with an item from a user and/or an amount of funds from a user is a progressive award, the maintained progressive award is also associated with a progressive award contribution rate that represents, in certain instances, the portion of each wager placed (or the portion of each designated wager, such as a maximum wager, placed) that is allocated to the progressive award. In certain embodiments, when contributing the item and/or the amount of funds, the user makes one or more inputs indicating the contribution rate as a parameter of the progressive award associated with the contribute item and/or contributed amount of funds. In certain embodiments wherein the system maintains a plurality of progressive awards, each of the progressive awards maintained by the system have the same progressive award contribution rate. In certain embodiments wherein the system maintains a plurality of progressive awards, two or more of the progressive awards maintained by the system have different progressive award contribution rates.

In certain embodiments in which the award at least partially seeded with an item from a user and/or an amount of funds from a user is a progressive award, the maintained progressive award is associated with a range of values, wherein the low end of the range of values represents the reset value of the progressive award and the high end of the range of values represents the maximum amount which the progressive award may reach. In these embodiments, the amount which the progressive award may be incremented to is capped or limited by the highest value in the value range associated with such progressive award. In these embodiments, the system determines a progressive award hit value from the value range associated with the progressive award and displays the current value of the progressive award and/or the maximum amount which the progressive award may reach. In other embodiments, the progressive award is not associated with any range of values. In this embodiment, the progressive award continues to be incremented until an award triggering event associated with the progressive award (i.e., a progressive award triggering event) occurs.

In certain embodiments in which the award at least partially seeded with an item from a user and/or an amount of funds from a user is a progressive award, the system determines if a progressive award increment event has occurred in association with the maintained progressive award. In one such embodiment, the progressive award increment event occurs based on (or as a result of) a wager being placed on a play of a game at an EGM associated with that award. In another such embodiment, the progressive award increment event additionally or alternatively occurs based on (or as a result of) a side wager being placed at an EGM associated with that award. In another such embodiment, the progressive award increment event additionally or alternatively occurs based on (or as a result of) one or more displayed events occurring in association with one or more plays of one or more games. In another such embodiment, the progressive award increment event occurs independent of any displayed events associated with any plays of any games.

If the system determines that a progressive award increment event occurred, the system increases a current value of the maintained progressive award. In certain embodiments wherein the progressive award increment event occurs based on a placed wager, the increase of the maintained award is funded by a portion of the wager placed (e.g., a progressive award contribution rate of 1% of the amount of the wager placed is allocated to growing the progressive award). In certain other embodiments wherein the progressive award increment event occurs based on a placed side wager, the increase of the maintained award is funded by part or all of the side wager placed (e.g., a progressive award contribution rate of 50% of the amount of the side wager placed is allocated to growing the progressive award). It should be appreciated that in these embodiments, the allocation of an amount to grow the progressive award is in addition to any allocation, upon an occurrence of a contribution escrow event, to grow an escrow to compensate the user for the seeding of the progressive award.

In addition enabling a user to contribute an item and/or an amount of funds to form at least part of an award and periodically growing an escrow based on plays of games that occur in an effort to win the formed award, the system determines if an award triggering event has occurred in association with the maintained award. In certain embodiments, an award triggering event occurs based on one or more displayed events associated with one or more plays of one or more games. In certain embodiments, an award triggering event occurs independent of any displayed events associated with any plays of any games.

If the system determines that no award triggering event occurred in association with the maintained award, the system continues to maintain the award and potentially increase an escrow associated with the maintained award. For example, if the award at least partially seeded with an item from a user and/or an amount of funds from a user is a progressive award and a progressive award triggering event occurs based on the current value of the progressive award reaching a randomly determined progressive award hit value, responsive to a determination that the current value of the progressive award is below the randomly determined progressive award hit value, the system determines that no progressive award triggering event occurred and again determines whether or not to increase the current value of the progressive award based on the occurrence of zero, one or more events. In another example, if an award triggering event occurs based on the determination and display of a symbol (or symbol combination) during a play of a game, responsive to a determination that the symbol (or symbol combination) did not occur during the play of the game, the system determines that no award triggering event occurred.

On the other hand, if the system determines that an award triggering event occurred in association with the maintained award, the system causes the maintained award to be provided to the player associated with the occurrence of the award triggering event. In one such embodiment if an award triggering event occurs based on the determination and display of a designated symbol (or designated symbol combination) during a play of a game, the system determines that an award triggering event occurred and the maintained award should be made available to the player associated with that play of the game. In another embodiment in which the award at least partially seeded with an item from a user and/or an amount of funds from a user is a progressive award, a progressive award triggering event occurs based on the current value of the progressive award reaching a randomly determined progressive award hit value, then following the placement of a wager which caused a progressive award increment event to occur and the current value of the progressive award to increase such that the now current value of the progressive award has reached the randomly determined progressive award hit value, the system determines that the progressive award triggering event occurred and causes the progressive award to be made available to a player.

In certain embodiments, the award at least partially seeded with an item from a user and/or an amount of funds from a user is associated with an auction. In these embodiments, upon an occurrence of an award auction triggering event associated with the award, the system triggers an auction bidding sequence. In certain embodiments, the award auction triggering event occurs based on a value of the maintained award relative to a threshold value. In certain embodiments, the award auction triggering event occurs in association with an award that the system no longer wants to maintain. In these embodiments, rather than waiting for an award triggering event to occur to potentially retire such an award, the system expedites the opportunity to retire that award by initiating an auction bidding sequence for that award. In certain embodiments, an award auction triggering event occurs based on one or more displayed events associated with one or more plays of one or more games. In certain embodiments, an award auction triggering event occurs independent of any displayed events associated with any plays of any games.

In certain embodiments, a triggered auction bidding sequence includes zero, one or more qualifying players submitting zero, one or more bids to potentially win the triggered auction bidding sequence and be provided the award being auctioned off. In certain embodiments, upon a conclusion of the triggered auction bidding sequence, such as after an amount of time and/or after a threshold quantity of qualifying players have submitted a threshold quantity of bids, the system determines if any players qualify as a winning player of the triggered auction bidding sequence. In these embodiments, if the system identifies a winning player of the triggered auction bidding sequence, the system facilitates the auctioned off award to be provided the winning player. On the other hand, if the system does not identify any winning player of the triggered auction bidding sequence, such as because the reserve or minimum bid amount for the award was not reached, the system continues to maintain the award until that award is again placed up for auction or otherwise won via an award triggering event.

In certain embodiments, in addition to or alternative from offering an auction bidding sequence to win a maintained award at least partially seeded with an item from a user and/or an amount of funds from a user, the award is associated with a "buy it now" price that enables a qualifying player to purchase or buy the contributed award. For example, following a user contributing a $4 k diamond ring as an award and a player playing for that award for three hours without winning it, the system enables the player to activate a feature to buy the award for $4200 (i.e., a "buy it now" feature). In this example, such an activation of the feature results in an occurrence of an award triggering event for the player and the player winning the contributed diamond ring.

In certain embodiments in which a user contributed an item and/or an amount of funds to seed an award and the system (or gaming establishment personnel associated with the system) is in possession of the item and/or the amount of funds, the system causes the award (including the contributed item and/or the contributed amount of funds) to be provided or otherwise made available to the player. In different embodiments, the system provides the award to the winning player via any of, but not limited to, an increase of a credit meter of an EGM, a handpay by gaming establishment personnel of the award, and an increase of a balance of an account, such as a cashless wagering account, associated with the player.

In certain embodiments in which a user contributed an item and/or an amount of funds to seed an award and the user retained possession of the item and/or the amount of funds, the system facilitates delivery of the item and/or the amount of funds from the contributing user to the winning player. In different embodiments, the user's contribution is shipped to an address associated with the winning player or shipped to another location, such as a local gaming establishment, for pickup by the winning player. In certain embodiments, the system employ a third-party to coordinate the delivery of an item from a user to a winning player. In certain embodiments in which the contributed amount of funds are held in an account associated with the system, the system operates to cause the contributed amount of funds to be transferred from that account to an account of the winning player.

In certain embodiments, the system operates with one or more online retail platforms in association with the contributed item being made available to the winning player. In one embodiment, upon a player winning an award inclusive of the contributed item, the system operates with the online retail platform to terminate the listing of the item on the online retail platform and arrange for delivery of the item to the winning player.

In certain embodiments, following an award inclusive of a contributed item being won (and/or an item offered for sale via an online retail platform no longer being available), the system notifies zero, one or more other players also playing for the contributed item. In these embodiments, since the contributed item is no longer available, the system enables such other players to select one or more other awards inclusive of one or more other items to play for. In certain such embodiments, the system suggests, based on player preferences and/or player historical data, one or more alternative contributed items to play for.

In certain embodiments, in addition to providing the award and/or contributed item to the player in association with the award triggering event, the system causes part or all of the escrowed amount of funds to be provided to the user that contributed the item and/or the amount of funds. That is, to compensate the user for contributing an item and/or an amount of funds to seed one or more awards, upon that item and/or that amount of funds being provided to a player, the system causes the contributing user to receive part or all of an amount of funds escrowed from wagers placed on plays of games to win the contributed item and/or contributed amount of funds. In different embodiments, the system causes the contributing user to be compensated via any of, but not limited to, an increase of a credit meter of an EGM being played by the user, an increase of a balance of a gaming establishment account, such as a cashless wagering account, associated with the user, an increase of a non-gaming establishment account, such as a financial institution checking account or a financial institution savings account, associated with the user, a issuance of a check to the user, an increase of a non-gaming establishment account, such as a financial institution checking account or a financial institution savings account, associated with a third-party, such as a charity selected by the user to receive the proceeds of the user's contribution, and/or a issuance of a check to a third-party, such as a charity selected by the user to receive the proceeds of the user's contribution.

It should be appreciated that in these embodiments, the growth of the escrow of portions of wagers placed to potentially win the user's contribution determines the return to the user for their contribution. That is, regardless of if an amount of wager contributions above an award starting value are escrowed, an amount of wager contributions above an average expected value of an award are escrowed or an amount of wager contributions above any other metric are escrowed, the randomness of winning an award associated with the escrowed contributions at least partially determines whether or not the contributing user wins or loses based on their contributions. Put differently, the more wagers unsuccessfully placed on plays of games to win the user's contribution, the larger the pool funded by at least a portion of these unsuccessful wagers becomes and the larger the payout eventually provided to the contributing user when an award triggering event occurs. For example, if a user contributed an item valued at $1000 and before that item is won, the system escrows $3000 from portions of unsuccessful wagers on plays of games to win that item, then the user's contribution (relative to the amount received from the system) results in a positive return. Conversely, the less wagers unsuccessfully placed on plays of games to win the user's contribution, the smaller the pool funded by at least a portion of these unsuccessful wagers becomes and the smaller the payout eventually provided to the contributing user when an award triggering event occurs. For example, if a user contributed an item valued at $1000 and before that item is won, the system escrows $500 from portions of unsuccessful wagers on plays of games to win that item, then the user's contribution (relative to the amount received from the system) results in a negative return to the user. As illustrated by these examples, the system of the present disclosure enables the gamification of a user's contribution by associating the amount received for the contribution to the randomness of when that contribution is provided in association with an award triggering event.

In certain embodiments, the amount provided to the user in exchange for their contribution is off-set by one or more fees imposed by the system. In these embodiments, to facilitate this feature and enable users to employ the system to dispose of property (i.e., contributed items and/or amounts of funds) for potentially more than the property is otherwise worth, the system charges a fee, such as a set amount or a percentage of the proceeds. In certain other embodiments, the system does not impose any fees.

In certain embodiments, the system enables the contribution to an award to be split between a user and a gaming establishment operating the system. In certain such embodiments, if the value of a contributed item and/or a contributed amount of funds does not reach the starting value of a maintained progressive award, the system makes up the difference and effectively partners with the contributing user for the proceeds from the growth. For example, if a user contributes an item worth $750 in association with a progressive award having a starting value of $1000, the system contributes $250 to the progressive award and the user and the system split the proceeds proportionally. In this example, if the progressive award is hit with $2000 escrowed based on wagers placed to win that maintained the progressive award, the user would receive $1500 and the gaming establishment operating the system would receive $500. In one embodiment, for providing the monetary contribution, the system charges a fee, such as a static amount or a percentage of the monetary contribution. In another embodiment, the system does not charge any fees for providing the monetary contribution.

In certain embodiments, the system enables the contribution to an award to be split between multiple users. In one such embodiment, if the value of a contributed item and/or a contributed amount of funds for one user does not reach the starting value of a maintained progressive award, the system enables one or more other users to make up the difference and partner with the contributing user for the proceeds from the growth. For example, if a user contributes an item worth $500 in association with a progressive award having a starting value of $1000, the system enable another user to contribute $500 (or an item valued at $500) to the progressive award and the two users split the proceeds proportionally. In this example, if the progressive award is hit with $4000 escrowed in association with that maintained the progressive award, each user would receive $2000.

In certain embodiments, rather than associating a contributed item with a specific award played for, the system enables a user to contribute an item independent of any specific award played for. In these embodiments, the system maintains a progressive award associated with an incrementing value and utilizes a value of the progressive award to potentially build an award that may or may not include a specific contributed item. In such embodiments, following an award being won, the system determines which users contributed which items determined to be part of the won award and causes a proportionate amount of escrowed funds associated with the won award to be allocated to such users. As such, while a contributed item of these embodiments may not initially be associated with a particular award, if that contributed item is ultimately included in an award won by a player, the system provides the contributing user at least a portion of the wagers placed to win that contributed item.

Figure 2:
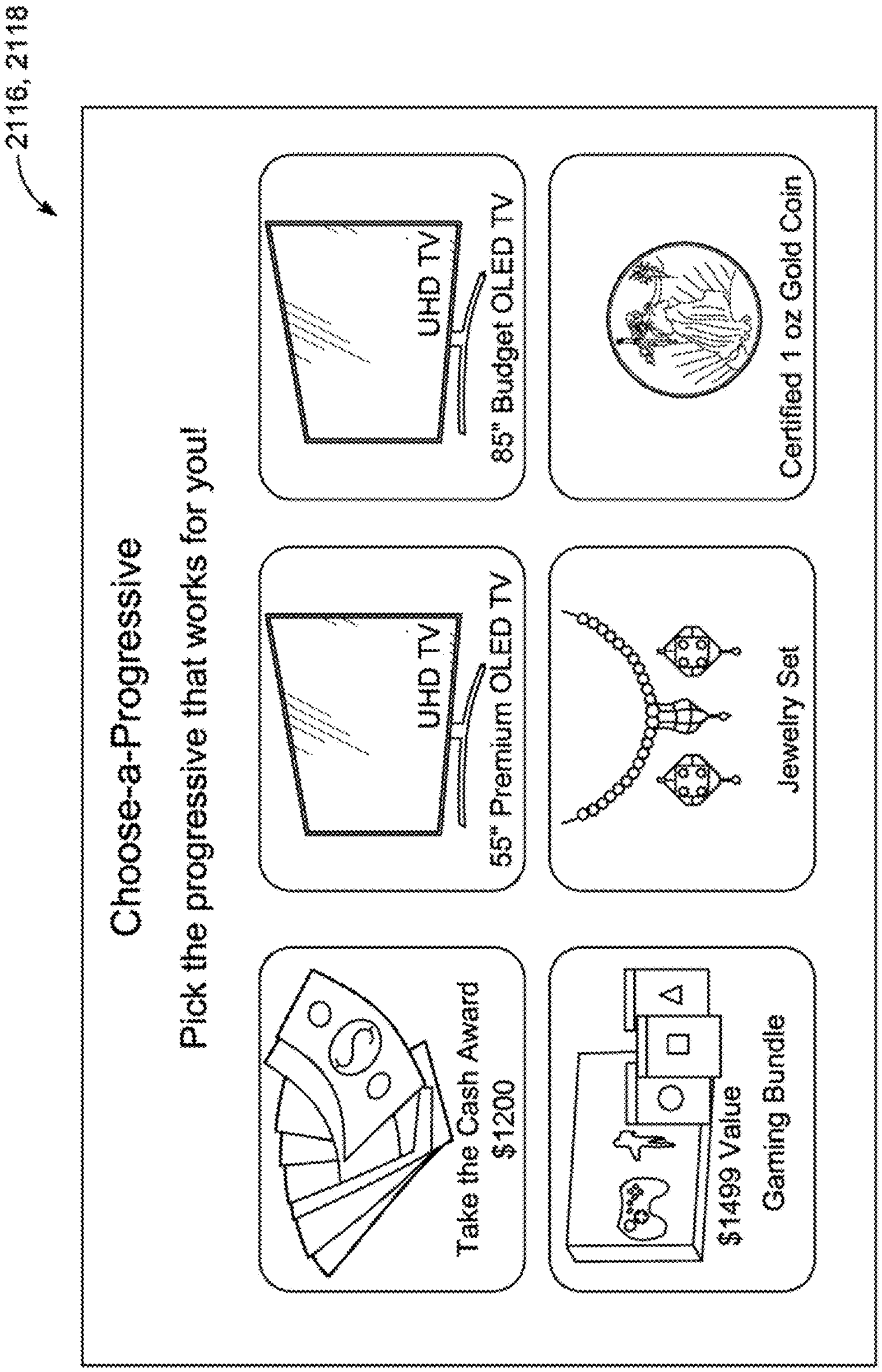
FIG. 2 is a front view of one embodiment of the system of the present disclosure illustrating a player at an electronic gaming machine having the opportunity to select one or more user contributed items to build a won award.

In certain embodiments, the system employs one or more player preferences (and/or historical player data) to associate certain contributed items to one or more awards being played for by a specific player. In certain other embodiments, the system enables a player to select one or more contributed items to play for. In certain other embodiments, upon an occurrence of a progressive award triggering event, the system enables a player that won the progressive award the opportunity to select one or more contributed items that collectively equal the current value of the progressive award. In these embodiments, in view of the different items contributed by one or more users and the different assigned values of such items relative to a value associated with a won progressive award, the system enables a player to select one or more contributed items until the assigned values of those items add up to the progressive amount. For example, as seen in FIG. 2, after winning a progressive award currently valued as $1200, the system employs an externally controlled interface displayed by an EGM (i.e., a service window) to choose between a $1200 cash award or multiple items of varying values. It should be appreciated that while illustrated as a player interfacing with a service window displayed by an EGM to select items to win in association with a progressive award triggering event, the system utilizes a mobile device running a mobile device application, a kiosk and/or a component of a gaming establishment patron management system (e.g., a player tracking unit) to select items to win in association with a progressive award triggering event.

In certain embodiments, the system employs a threshold as an amount and/or a percent which the total value of the items selected must land within the value of the progressive award to enable such a feature. In one such embodiment, any difference between the collective assigned values of the selected items and the value of the won progressive award item value and the progressive value is made up by the player (e.g., if the items selected by the player add up to $1225 for a win of $1200, the system removes $25 from the player's EGM credit balance or removes $25 from a cashless wagering account associated with the player).

Figure 3:
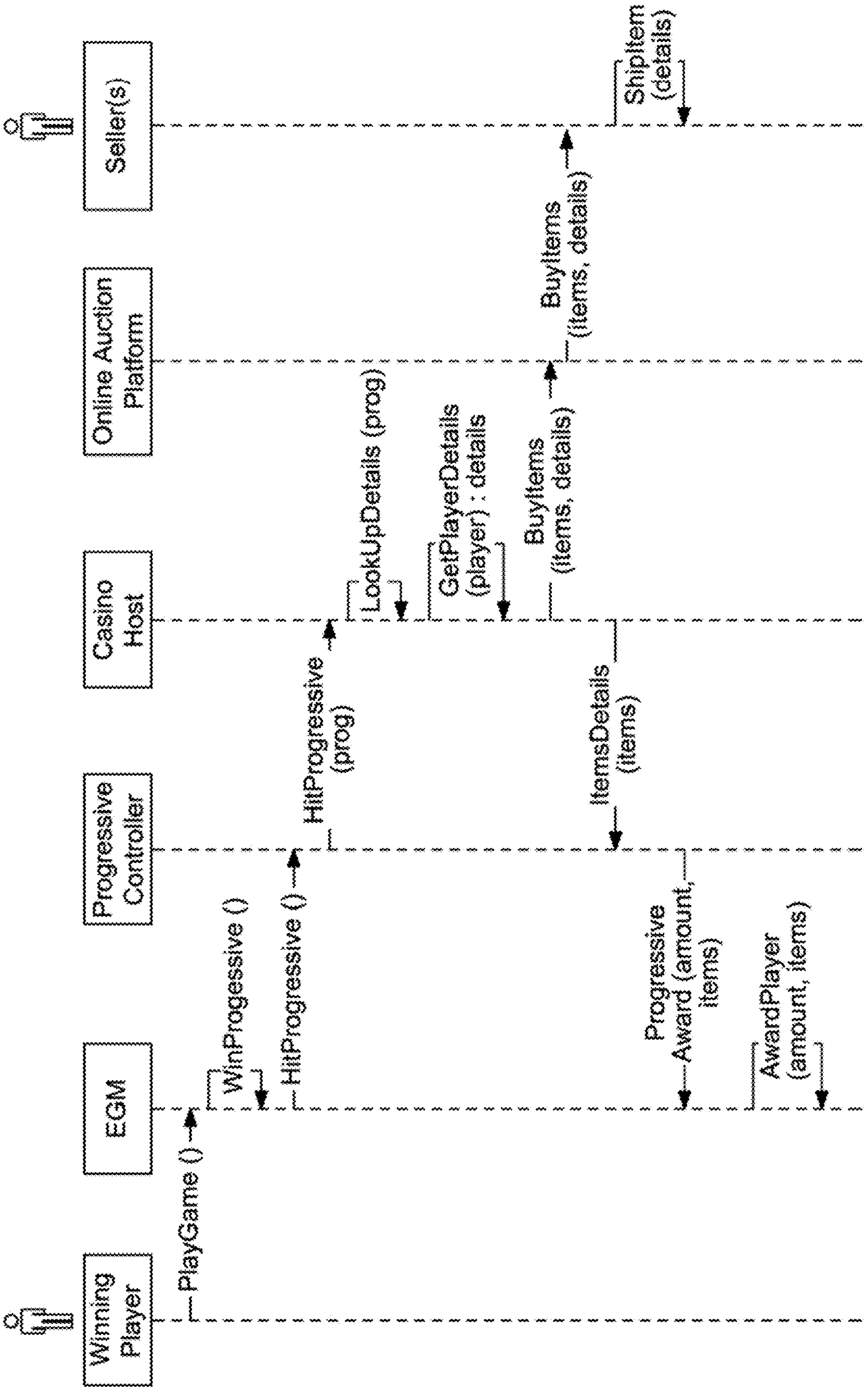
FIG. 3 is a flow chart of an example process for operating a system that enables an item listed for sale on an online auction platform to be procured in association with an award won from a play of a game.

In certain embodiments upon a player winning a progressive award and the winning player selecting an item to be part of the won progressive award, the system operates with an online retail platform to procure the item. In these embodiments, the online retail platform, such as an online auction platform, holds the item such that upon the item being selected by the winning player, the system operates with the online retail platform to obtain and deliver the item to the winning player. For example, as seen in FIG. 3 (which illustrates certain interactions between the winning player, the EGM, a progressive controller tasked with maintaining a progressive award, a component of a gaming establishment operating as the system of the present disclosure tasked with coordinating the procurement of an item in association with a progressive award, an online auction platform and a seller of the online auction platform), following a progressive award triggering event and the winning player selecting items having a collective value within a designated range of the value of the won progressive award, the component of the gaming establishment (i.e., the Casino Host) operates to buy such items from the online retail platform for shipping by the seller to the winning player. In this example, the EGM notifies the progressive controller (which is illustrated as a separate component but could be part of the component of the gaming establishment) of the occurrence of the progressive award triggering event and the amount of the win. Aware of the items selected by the winning player (either in association with the win or previously set up as a player preference), the progressive controller and/or the component of the gaming establishment interface with the online auction platform to buy the items and provide the player's address to the seller to ship the items to the winning player.

In certain of these embodiments in which the system procures one or more items from an online retail platform, the system employs certain safeguards when interfacing with the online retail platform. In one such embodiment, the system uses a seller's rating on the online retail platform to determine if a listed item can be procured. For example, a poor seller rating prohibits any items being sold by that seller to be purchased in association with a won progressive award. In another such embodiment, the system additionally or alternatively uses a price of the item relative to historical prices of the same (or similar) item on the online retail platform to determine if a listed item can be procured. For example, an item is currently for sale on an online retail platform and the purchase price of that item is greater than 10% more than previous purchase prices for that item, the system prohibit that item to be purchased in association with a won progressive award. In another such embodiment, the system additionally or alternatively uses an item's location relative to the location of the winning player and/or shipping costs to determine if a listed item can be procured.

Accordingly, unlike prior systems that provided unwanted/unneeded items to individuals as awards, the system of the present disclosure offers an avenue for such individuals to dispense of such items in a way that may be potentially even more lucrative than initially winning the item. Additionally, by operating with one or more online retail platforms in which the item is otherwise available, such as an online auction platform, the system offers an additional avenue for individuals to exchange such items in a way that may be potentially even more lucrative than selling the item via the online retail platform. Moreover, unlike prior systems that provided users no ability to back any awards, the system of the present disclosure enables users to bankroll one or more awards in which the upside of at least a portion of unsuccessful wagers placed on that award are allocated to the contributing user. Such a configuration introduces an improvement by ensuring that users of the system are playing for the awards they want and/or can risk unwanted awards and/or products in exchange for possible higher valued awards.

In different embodiments, as described above, a user contribution event, a contribution escrow event and/or an award triggering event occurs based on an outcome associated with one or more plays of any primary games or any secondary games. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game (and/or a secondary game) causes such conditions to be satisfied and/or one or more of such events to occur.

In different embodiments, the system does not provide any apparent reasons to the players for an occurrence of a progressive award increment event, an award auction triggering event, an auction bidding sequence termination event, a progressive award triggering event, and/or a progressive award reset event. In these embodiments, such determinations are not triggered by an event in a primary game or based specifically on any of the plays of any primary games or any secondary games. That is, these events occur without any explanation or alternatively with simple explanations.

In one such embodiment, a user contribution event, a contribution escrow event and/or an award triggering event occurs based on an amount of coin-in. In this embodiment, the system determines if an amount of coin-in reaches or exceeds a designated amount of coin-in (i.e., a threshold coin-in amount). Upon the amount of coin-in wagered reaching or exceeding the threshold coin-in amount, the system causes one or more of such events or conditions to occur. In another such embodiment, a user contribution event, a contribution escrow event and/or an award triggering event occurs based on an amount of virtual currency-in. In this embodiment, the system determines if an amount of virtual currency-in wagered reaches or exceeds a designated amount of virtual currency-in (i.e., a threshold virtual currency-in amount). Upon the amount of virtual currency-in wagered reaching or exceeding the threshold virtual currency-in amount, the system causes one or more of such events or conditions to occur. In different embodiments, the threshold coin-in amount and/or the threshold virtual currency-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In one such embodiment, a user contribution event, a contribution escrow event and/or an award triggering event occurs based on an amount of coin-out. In this embodiment, the system determines if an amount of coin-out reaches or exceeds a designated amount of coin-out (i.e., a threshold coin-out amount). Upon the amount of coin-out reaching or exceeding the threshold coin-out amount, the system causes one or more of such events or conditions to occur. In another such embodiment, a user contribution event, a contribution escrow event and/or an award triggering event occurs based on an amount of virtual currency-out. In this embodiment, the system determines if an amount of virtual currency-out reaches or exceeds a designated amount of virtual currency-out (i.e., a threshold virtual currency-out amount). Upon the amount of virtual currency-out reaching or exceeding the threshold virtual currency-out amount, the system causes one or more of such events or conditions to occur. In different embodiments, the threshold coin-out amount and/or the threshold virtual currency-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In different embodiments, a user contribution event, a contribution escrow event and/or an award triggering event occurs based on a predefined variable reaching a defined parameter threshold. For example, when a quantity of players have played an EGM (ascertained from a player tracking system), one or more of such events or conditions occur. In different embodiments, the predefined parameter thresholds include a length of time, a length of time after a certain dollar amount is hit, a wager level threshold for a specific device (which gaming device is the first to contribute a predetermined amount), a number of gaming devices active, or any other parameter that defines a suitable threshold.

In different embodiments, a user contribution event, a contribution escrow event and/or an award triggering event occurs based on a quantity of games played. In this embodiment, a quantity of games played is set for when one or more of such events or conditions will occur. In one embodiment, such a set quantity of games played is based on historic data.

In different embodiments, a user contribution event, a contribution escrow event and/or an award triggering event occurs based on time. In this embodiment, a time is set for when one or more of such events or conditions will occur. In one embodiment, such a set time is based on historic data.

In different embodiments, a user contribution event, a contribution escrow event and/or an award triggering event occurs based upon system operator defined player eligibility parameters stored on a player tracking system (such as via a player tracking card or other suitable manner). In this embodiment, the parameters for eligibility are defined by the system operator based on any suitable criterion. In one embodiment, the system recognizes the player's identification (via the player tracking system) when the player inserts or otherwise associates their player tracking card in the EGM and/or logs into the player tracking system using a mobile device, such as a personal gaming device. The system determines the player tracking level of the player and if the current player tracking level defined by the system operator is eligible for one or more of such events or conditions. In one embodiment, the system operator defines minimum bet levels required for such events or conditions to occur based on the player's card level.

In different embodiments, a user contribution event, a contribution escrow event and/or an award triggering event occurs based on a system determination, including one or more random selections by the central controller. For example, as described above, the system tracks all active EGMs and the wagers they placed, wherein based on the EGM's state as well as one or more wager pools associated with the EGM, the system determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In different embodiments, a user contribution event, a contribution escrow event and/or an award triggering event occurs based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of such events or conditions occur.

It should be appreciated that any suitable manner of causing a user contribution event, a contribution escrow event and/or an award triggering event to occur may be implemented in accordance with the system and method of the present disclosure. It should be further appreciated that one or more of the above-described triggers pertaining to a user contribution event, a contribution escrow event and/or an award triggering event occurring may be combined in one or more different embodiments.

It should be appreciated that in different embodiments, one or more of: when a user contribution event, a contribution escrow event and/or an award triggering event occurs; a frequency which a user contribution event, a contribution escrow event and/or an award triggering event occur; which items are contributable to an award; which users may contribute one or more items and/or an amount of funds to an award; one or more parameters of one or more awards at least partially funded by user contributions; and/or any determination of the present disclosure is/are predetermined, randomly determined, randomly determined based on one or more weighted percentages, determined based on a symbol or symbol combination, determined independent of any symbols or symbol combinations, determined based on a random determination by a server, determined independent of a random determination by a server, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations of the present disclosure, determined independent of any other determination of the present disclosure or determined based on any other suitable method or criteria.

The above-described embodiments of the present disclosure may be implemented in accordance with or in conjunction with one or more of a variety of different types of systems, such as, but not limited to, those described below.

The present disclosure contemplates a variety of different systems each having one or more of a plurality of different features, attributes, or characteristics. A "system" as used herein refers to various configurations of: (a) one or more servers; (b) one or more electronic gaming machines such as those located on a casino floor; and/or (c) one or more personal gaming devices. Thus, in various embodiments, the system of the present disclosure includes: (a) one or more electronic gaming machines in combination with one or more servers; (b) one or more personal gaming devices in combination with one or more servers; (c) one or more personal gaming devices in combination with one or more electronic gaming machines; (d) one or more personal gaming devices, one or more electronic gaming machines, and one or more servers in combination with one another; (e) a single electronic gaming machine; (f) a plurality of electronic gaming machines in combination with one another; (g) a single personal gaming device; (h) a plurality of personal gaming devices in combination with one another; (i) a single server; and/or (j) a plurality of servers in combination with one another. For brevity and clarity and unless specifically stated otherwise, "EGM" as used herein represents one EGM or a plurality of EGMs, "personal gaming device" as used herein represents one personal gaming device or a plurality of personal gaming devices, and "server" as used herein represents one server or a plurality of servers.

As noted above, in various embodiments, the system includes an EGM (or personal gaming device) in combination with a server. In such embodiments, the EGM (or personal gaming device) is configured to communicate with the server through a data network or remote communication link. In certain such embodiments, the EGM (or personal gaming device) is configured to communicate with another EGM (or personal gaming device) through the same data network or remote communication link or through a different data network or remote communication link. For example, the system includes a plurality of EGMs that are each configured to communicate with a server through a data network.

In certain embodiments in which the system includes an EGM (or personal gaming device) in combination with a server, the server is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the server. The at least one processor of that EGM (or personal gaming device) is configured to execute the events, messages, or commands represented by such data or signals in conjunction with the operation of the EGM (or personal gaming device). Moreover, the at least one processor of the server is configured to transmit and receive data or signals representing events, messages, commands, or any other suitable information between the server and the EGM (or personal gaming device). The at least one processor of the server is configured to execute the events, messages, or commands represented by such data or signals in conjunction with the operation of the server. One, more than one, or each of the functions of the server may be performed by the at least one processor of the EGM (or personal gaming device). Further, one, more than one, or each of the functions of the at least one processor of the EGM (or personal gaming device) may be performed by the at least one processor of the server.

In certain such embodiments, computerized instructions for controlling any games (such as any primary or base games and/or any secondary or bonus games) displayed by the EGM (or personal gaming device) are executed by the server. In such "thin client" embodiments, the server remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the server to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the system includes an EGM (or personal gaming device) and a server, computerized instructions for controlling any primary or base games displayed by the EGM (or personal gaming device) are communicated from the server to the EGM (or personal gaming device) in a thick client configuration, and computerized instructions for controlling any secondary or bonus games or other functions displayed by the EGM (or personal gaming device) are executed by the server in a thin client configuration.

In certain embodiments in which the system includes: (a) an EGM (or personal gaming device) configured to communicate with a server through a data network; and/or (b) a plurality of EGMs (or personal gaming devices) configured to communicate with one another through a data network, the data network is a local area network (LAN) in which the EGMs (or personal gaming devices) are located substantially proximate to one another and/or the server. In one example, the EGMs (or personal gaming devices) and the server are located in a gaming establishment or a portion of a gaming establishment.

In other embodiments in which the system includes: (a) an EGM (or personal gaming device) configured to communicate with a server through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the server. For example, one or more of the EGMs (or personal gaming devices) are located: (a) in an area of a gaming establishment different from an area of the gaming establishment in which the server is located; or (b) in a gaming establishment different from the gaming establishment in which the server is located. In another example, the server is not located within a gaming establishment in which the EGMs (or personal gaming devices) are located. In certain embodiments in which the data network is a WAN, the system includes a server and an EGM (or personal gaming device) each located in a different gaming establishment in a same geographic area, such as a same city or a same state. Systems in which the data network is a WAN are substantially identical to systems in which the data network is a LAN, though the quantity of EGMs (or personal gaming devices) in such systems may vary relative to one another.

In further embodiments in which the system includes: (a) an EGM (or personal gaming device) configured to communicate with a server through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the server identifies a player before enabling that player to place any wagers on any plays of any wagering games. In one example, the server identifies the player by requiring a player account of the player to be logged into via an input of a unique username and password combination assigned to the player. The server may, however, identify the player in any other suitable manner, such as by validating a player tracking identification number associated with the player; by reading a player tracking card or other smart card inserted into a card reader (as described below); by validating a unique player identification number associated with the player by the server; or by identifying the EGM (or personal gaming device), such as by identifying the MAC address or the IP address of the Internet facilitator. In various embodiments, once the server identifies the player, the server enables placement of one or more wagers on one or more plays of one or more primary or base games and/or one or more secondary or bonus games, and displays those plays via the Internet browser of the EGM (or personal gaming device).

The server and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Figure 4:
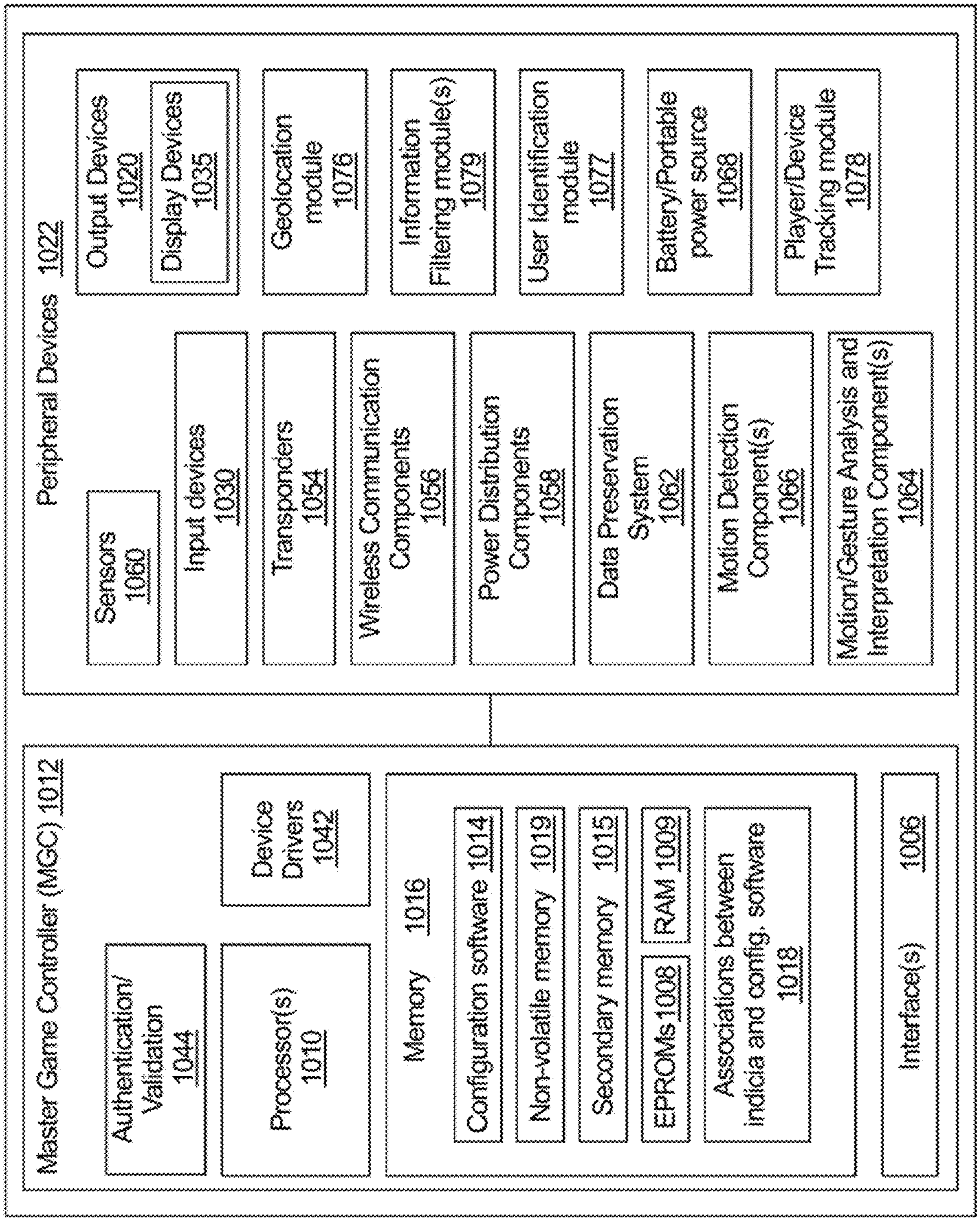
FIG. 4 is a schematic block diagram of one embodiment of an electronic configuration of an example electronic gaming machine of the present disclosure.
Figure 5A:
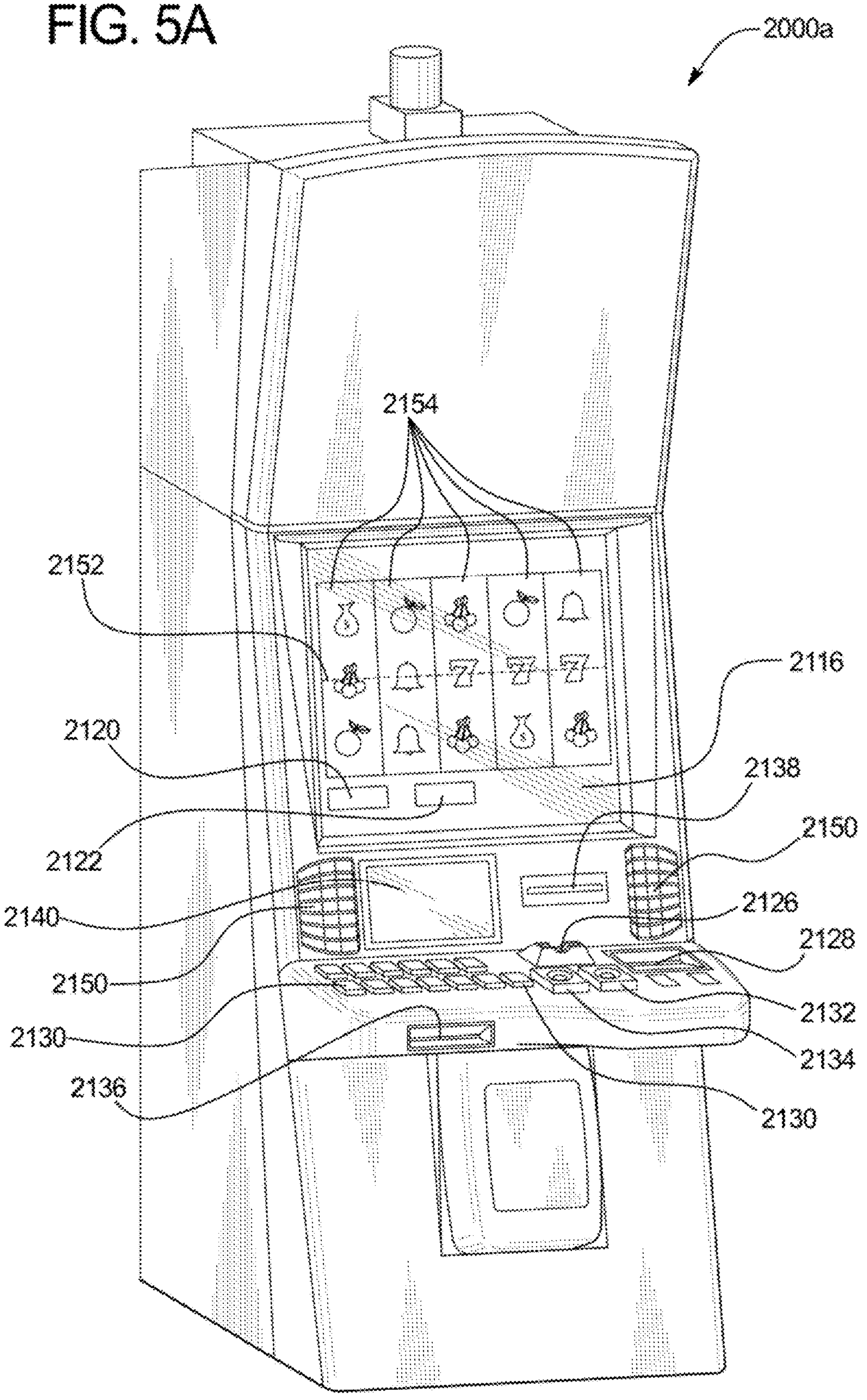
FIGS. 5A and 5B are perspective views of example alternative embodiments of an electronic gaming machine of the present disclosure.
Figure 5B:
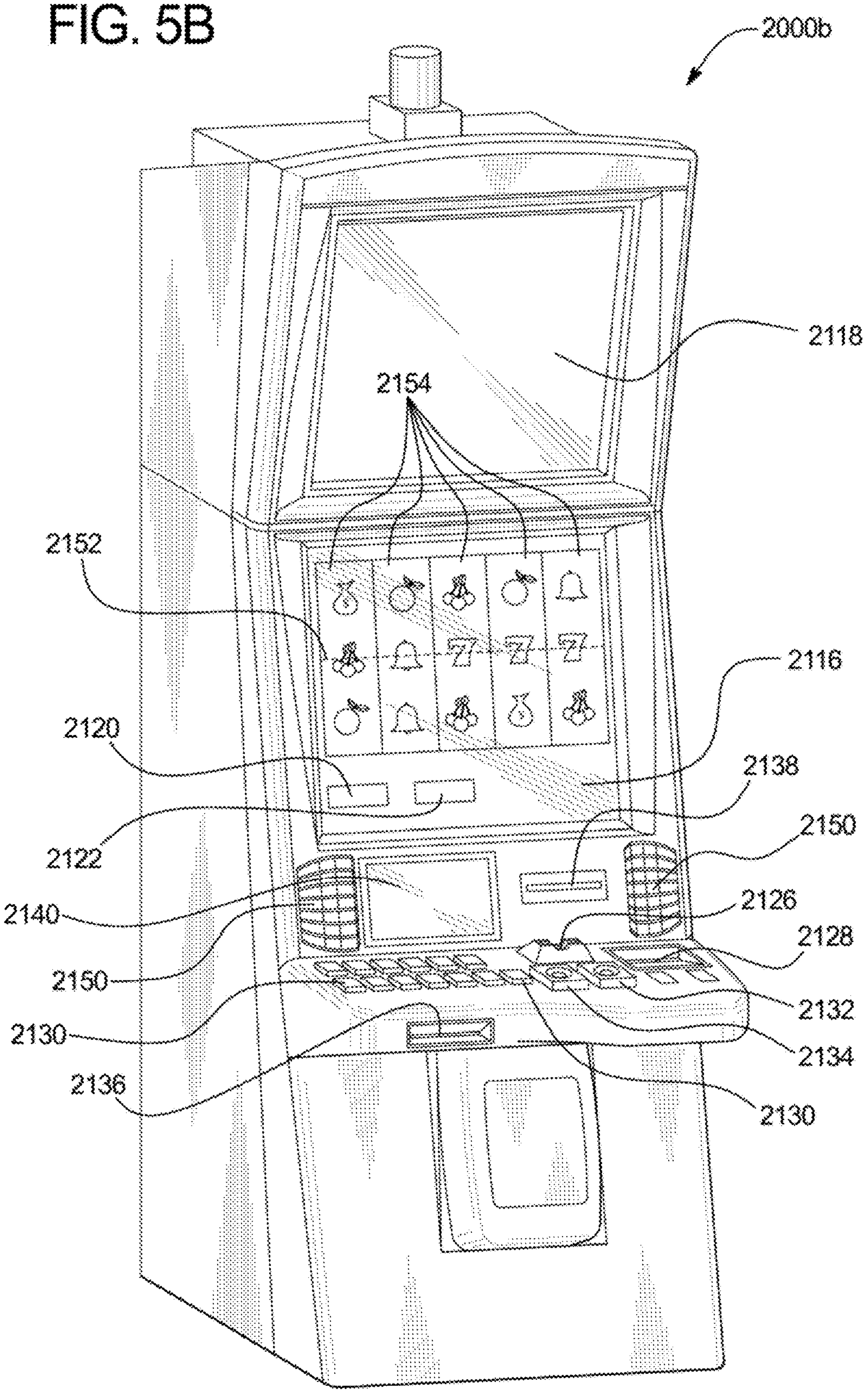
Figure 5C:
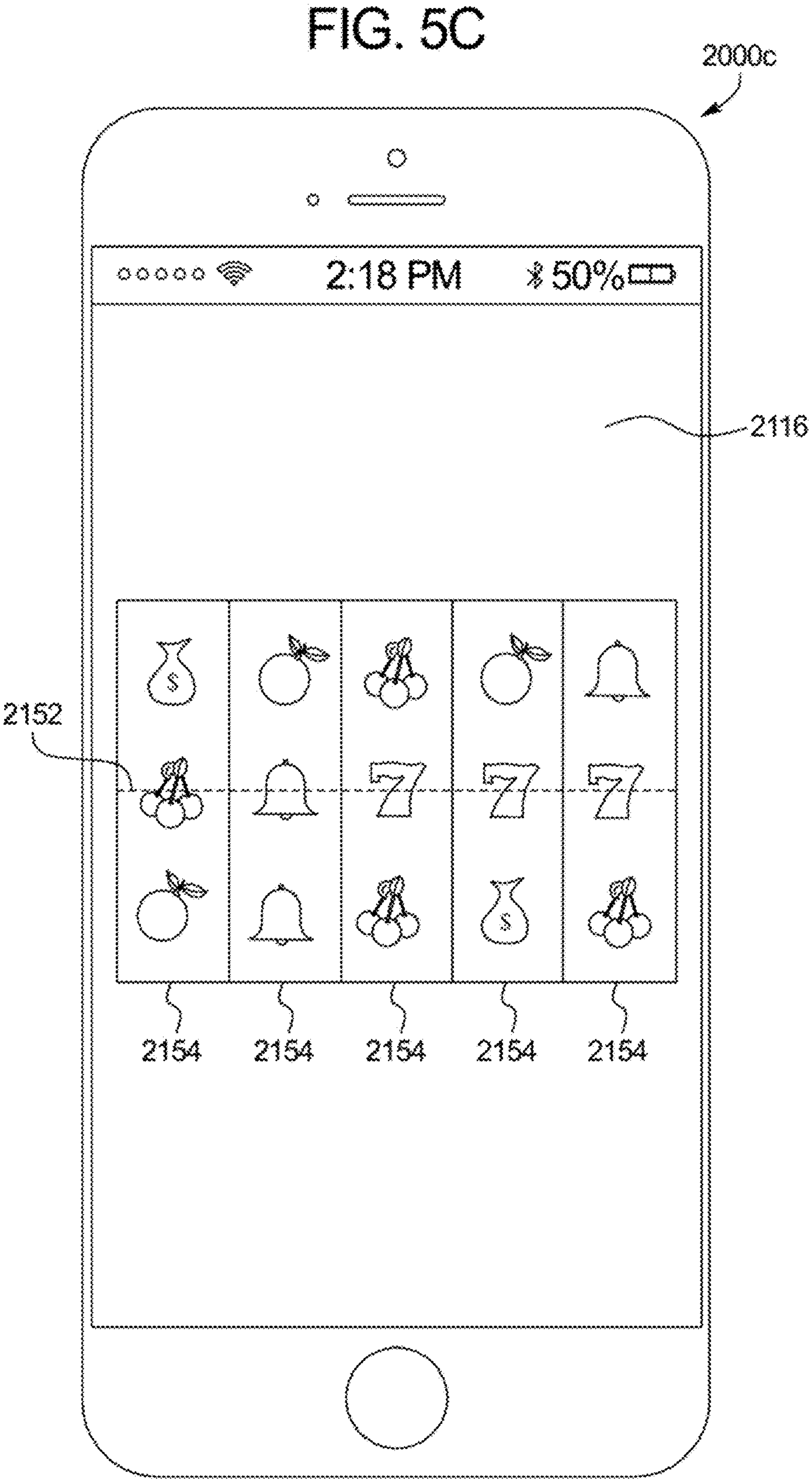
FIG. 5C is a front view of an example personal gaming device of the present disclosure.

FIG. 4 is a block diagram of an example EGM 1000 and FIGS. 5A and 5B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 5C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 5A includes a central display device 2116, a player tracking display 2140, a credit display 2120, and a bet display 2122. The example EGM 2000*b* illustrated in FIG. 5B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 5A and 5B each include a ticket printer and dispenser 2136.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 5A and 5B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 5A and 5B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 5A and 5B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 5A and 5B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 5A and 5B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 5A and 5B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000*a* and 2000*b* illustrated in FIGS. 5A and 5B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 5A and 5B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all systems, and these example EGMs may not include one or more elements that are included in other systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the system includes a server and a changeable EGM, the at least one memory device of the server stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the server is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the server to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the system generates the game outcome(s) and/or the award(s) to be provided based on the associated probabilities. In these embodiments, since the system generates game outcomes and/or awards randomly or based on one or more probability calculations, there is no certainty that the system will ever provide any specific game outcome and/or award.

In certain embodiments, the system maintains one or more predetermined pools or sets of predetermined game outcomes and/or awards. In certain such embodiments, upon generation or receipt of a game outcome and/or award request, the system independently selects one of the predetermined game outcomes and/or awards from the one or more pools or sets. The system flags or marks the selected game outcome and/or award as used. Once a game outcome or an award is flagged as used, it is prevented from further selection from its respective pool or set; that is, the system does not select that game outcome or award upon another game outcome and/or award request. The system provides the selected game outcome and/or award.

In certain embodiments, the system determines a predetermined game outcome and/or award based on the results of a bingo, keno, or lottery game. In certain such embodiments, the system utilizes one or more bingo, keno, or lottery games to determine the predetermined game outcome and/or award provided for a primary game and/or a secondary game. The system is provided or associated with a bingo card. Each bingo card consists of a matrix or array of elements, wherein each element is designated with separate indicia. After a bingo card is provided, the system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the system includes a server and an EGM, the EGM is configured to communicate with the server for monitoring purposes only. In such embodiments, the EGM determines the game outcome(s) and/or award(s) to be provided in any of the manners described above, and the server monitors the activities and events occurring on the EGM. In one such embodiment, the system includes a real-time or online accounting and gaming information system configured to communicate with the server. In this embodiment, the accounting and gaming information system includes: (a) a player database configured to store player profiles, (b) a player tracking module configured to track players (as described below), and (c) a credit system configured to provide automated transactions.

As noted above, in various embodiments, the system includes one or more executable game programs executable by at least one processor of the system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the system. In certain such embodiments, the system includes one or more paylines associated with the reels. The example EGM 2000 *b* shown in FIG. 5B includes a payline 2152 and a plurality of reels 2154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The system enables a wager to be placed on one or more of such paylines to activate such paylines. In other embodiments in which one or more paylines are formed between at least two adjacent symbol display areas, the system enables a wager to be placed on a plurality of symbol display areas, which activates those symbol display areas.

In various embodiments, the system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the system includes a progressive award. Typically, a progressive award includes an initial amount and an additional amount funded through a portion of each wager placed to initiate a play of a primary game. When one or more triggering events occurs, the system provides at least a portion of the progressive award. After the system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the system automatically provides or initiates the secondary game upon the occurrence of a triggering event or the satisfaction of a qualifying condition. In other embodiments, the system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards.

In various embodiments, the system includes one or more player tracking systems. Such player tracking systems enable operators of the system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the system to begin a gaming session, the card reader reads the player identification number off the player tracking card to identify the player. The system timely tracks any suitable information or data relating to the identified player's gaming session. The system also timely tracks when the player tracking card is removed to conclude play for that gaming session. In another embodiment, rather than requiring insertion of a player tracking card into the card reader, the system utilizes one or more portable devices, such as a mobile phone, a radio frequency identification tag, or any other suitable wireless device, to track when a gaming session begins and ends. In another embodiment, the system utilizes any suitable biometric technology or ticket technology to track when a gaming session begins and ends.

In such embodiments, during one or more gaming sessions, the system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

In various embodiments, the system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the system includes a geo-fence system that enables tethered game play within a particular geographic area but not outside of that geographic area.

In certain embodiments, the system is configured to communicate with a social network server that hosts or partially hosts a social networking website via a data network (such as the Internet) to integrate a player's gaming experience with the player's social networking account. This enables the system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the system to receive certain information from the social network server, such as the player's likes or dislikes or the player's list of connections. In certain embodiments, the system enables the player to link the player's player account to the player's social networking account(s). This enables the system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the system enables the player to recommend a game to the player's connections by posting a recommendation to the player's wall (or other suitable area) of the social networking website.

Certain of the systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A system comprising:

a processor; and a memory device that stores a plurality of instructions that, when executed by the processor, cause the processor to:

responsive to an occurrence of a user contribution event independent of any placement of any wager in association with any play of any game:

enable a user to contribute an item, and associate the contributed item with an award, responsive to an occurrence of a contribution escrow event, escrow a separate amount in association with the contributed item, responsive to a receipt of data associated with an opening of an access door of a housing of an electronic gaming machine being detected via a security monitoring circuit supported by the housing of the electronic gaming machine following the escrow of the separate amount in association with the contributed item:

disable the escrowed amount from being provided in association with the electronic gaming machine, and following a receipt of data associated with at least a closing of the access door being detected via the security monitoring circuit, enable the escrowed amount to be provided in association with the electronic gaming machine, and responsive to an occurrence of an award triggering event:

cause at least the contributed item to be provided to a player associated with the occurrence of the award triggering event, and cause at least a portion of the escrowed amount to be provided to the user.

2. The system of claim 1, wherein the association of the contributed item with the award comprises a creation of the award.

3. The system of claim 1, wherein the contribution escrow event occurs in association with a wager placed on a play of a game to win the award and the escrowed amount comprises a portion of the wager.

4. The system of claim 1, wherein the memory device stores a plurality of further instructions that, when executed by the processor responsive to the occurrence of the award triggering event, cause the processor to cause the contributed item to be provided to the player in association with an online auction platform.

5. The system of claim 1, wherein the award comprises a progressive award.

6. The system of claim 5, wherein the contributed item has a value corresponding to a startup value of the progressive award.

7. The system of claim 5, wherein the contributed item comprises one of a plurality of items that collectively have a value corresponding to a startup value of the progressive award.

8. The system of claim 1, wherein the memory device stores a plurality of further instructions that, when executed by the processor responsive to the occurrence of the user contribution event, cause the processor to enable the user to contribute the item in association with an online auction platform.

9. The system of claim 8, wherein the association with the online auction platform comprises linking a listing to sell the item with the award.

10. The system of claim 1, wherein the contributed item comprises an award previously won by the user in association with a prior play of a game.

11. A system comprising:

a processor; and a memory device that stores a plurality of instructions that, when executed by the processor, cause the processor to:

responsive to an occurrence of a user contribution event independent of any placement of any wager in association with any play of any game:

enable a user to contribute an amount of funds, and associate the contributed amount of funds with a progressive award, responsive to an occurrence of a progressive award increment event:

increase a value of the progressive award, and escrow a separate amount in association with the contributed amount of funds, responsive to a receipt of data associated with an opening of an access door of a housing of an electronic gaming machine being detected via a security monitoring circuit supported by the housing of the electronic gaming machine following the escrow of the separate amount in association with the contributed amount of funds:

disable the escrowed amount from being provided in association with the electronic gaming machine, and following a receipt of data associated with at least a closing of the access door being detected via the security monitoring circuit, enable the escrowed amount to be provided in association with the electronic gaming machine, and responsive to an occurrence of an award triggering event:

cause the progressive award to be provided to a player associated with the occurrence of the award triggering event, and cause at least a portion of the escrowed amount to be provided to the user.

12. The system of claim 11, wherein the association of the contributed amount of funds with the progressive award comprises a creation of the progressive award.

13. The system of claim 11, wherein the progressive award increment event occurs in association with a wager placed on a play of a game to win the progressive award.

14. The system of claim 13, wherein the increase of the value of the progressive award and the escrowed amount are each based on a different portion of the wager.

15. The system of claim 11, wherein the contributed amount of funds comprises a startup value of the progressive award.

16. The system of claim 11, wherein the contributed amount of funds comprises a portion of a startup value of the progressive award.

17. A system comprising:

a processor; and a memory device that stores a plurality of instructions that, when executed by the processor, cause the processor to:

responsive to a receipt of data associated with an opening of an access door of a housing of an electronic gaming machine being detected via a security monitoring circuit supported by the housing of the electronic gaming machine following an element of value contributed by a user independent of any placement of any wager in association with any play of any game:

disable the element of value being provided in association with the electronic gaming machine, and following a receipt of data associated with at least a closing of the access door being detected via the security monitoring circuit, enable the element of value to be provided in association with the electronic gaming machine, responsive to a random occurrence of an award triggering event at a first point in time when a first amount of funds are escrowed in association with the element of value contributed by the user:

cause a first award inclusive of the element of value to be provided to a first player associated with the occurrence of the award triggering event, and cause at least a portion of the first amount of funds to be provided to the user, and responsive to the random occurrence of the award triggering event at a second, subsequent point in time when a greater, second amount of funds are escrowed in association with the element of value contributed by the user:

cause a second award inclusive of the element of value to be provided to a second player associated with the occurrence of the award triggering event, and cause at least a portion of the second amount of funds to be provided to the user.

18. The system of claim 17, wherein the first award has a first value and the second award has a second, different value.

19. The system of claim 17, wherein the first player and the second player are different players.

20. The system of claim 17, wherein the memory device stores a plurality of further instructions that, when executed by the processor, cause the processor to escrow funds in association with the element of value in association with wagers placed.

* * * * *